Nov. 28, 1939.   R. B. BEISEL   2,181,501
AIRPLANE CONTROL DEVICE
Filed June 18, 1938   2 Sheets-Sheet 1

INVENTOR.
Rex B. Beisel
BY Harris G. Luther
ATTORNEY

Nov. 28, 1939.  R. B. BEISEL  2,181,501
AIRPLANE CONTROL DEVICE
Filed June 18, 1938  2 Sheets-Sheet 2

INVENTOR.
Rex B. Beisel
BY Harris G. Luther
ATTORNEY

Patented Nov. 28, 1939

2,181,501

UNITED STATES PATENT OFFICE 2,181,501

AIRPLANE CONTROL DEVICE

Rex B. Beisel, West Hartford, Conn., assignor to United Aircraft Corporation, East Hartford, Conn., a corporation of Delaware Application June 18, 1938, Serial No. 214,486

7 Claims. (Cl. 244—83)

This invention relates to improvements in airplane control devices and has particular reference to an improved device for operating lateral control members.

An object of the invention resides in the provision of an improved control device of the character specified which is operative to give to a control element a much greater movement in one direction from its neutral position than in the other.

A more specific object of the invention resides in the provision of a simple and efficient linkage arrangement by means of which an airplane control member such as a lift spoiler may be tilted through a large angle above the wing upon a movement of the control columns in one direction, without being tilted through an equal angle below its neutral position into the wing when the control column is moved an equal amount in the opposite direction.

Other objects and advantages will be more particularly pointed out hereinafter or will become apparent as the description proceeds.

In the accompanying drawings in which like reference numerals are used to designate similar parts throughout there is illustrated by way of example, a suitable constructional embodiment of the invention. The drawings, however, are for the purpose of illustration only and are not to be taken as limiting or restricting the invention as set forth in the accompanying claims.

In the drawings

Figure 1:
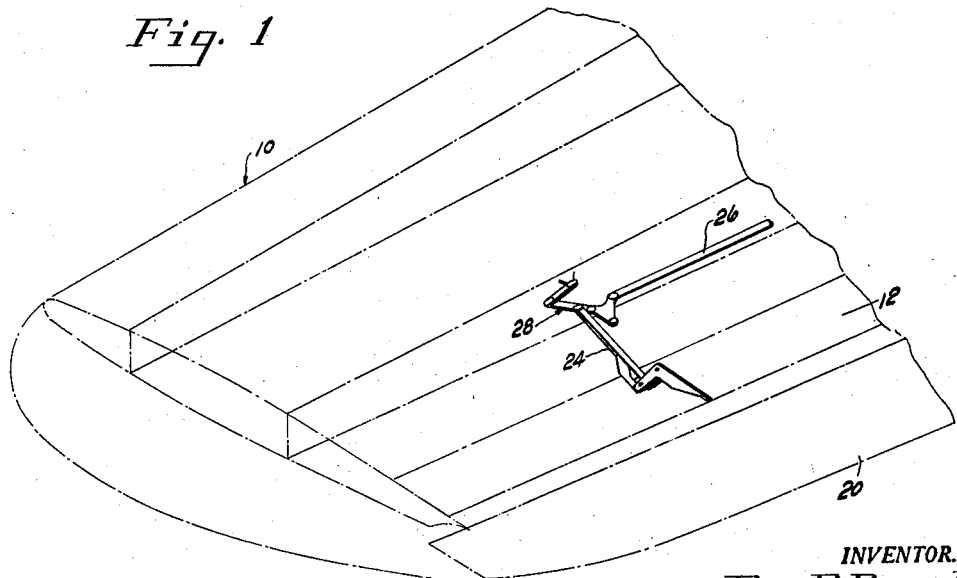
Fig. 1 is a diagrammatic perspective view of a fragmentary portion of an airplane wing showing the device of the invention applied thereto.

Referring to the drawings in detail and particularly to Fig. 1, the numeral 10 generally indicates an airplane wing provided with a lateral control device in the form of a pivoted flap 12 which acts, when inclined to extend above the upper surface of the wing, as a wing lift spoiling device. The lateral control element 12 is operated by a control column or wheel, not illustrated, through suitable linkage including the elements diagrammatically shown in Fig. 1.

Figure 3:
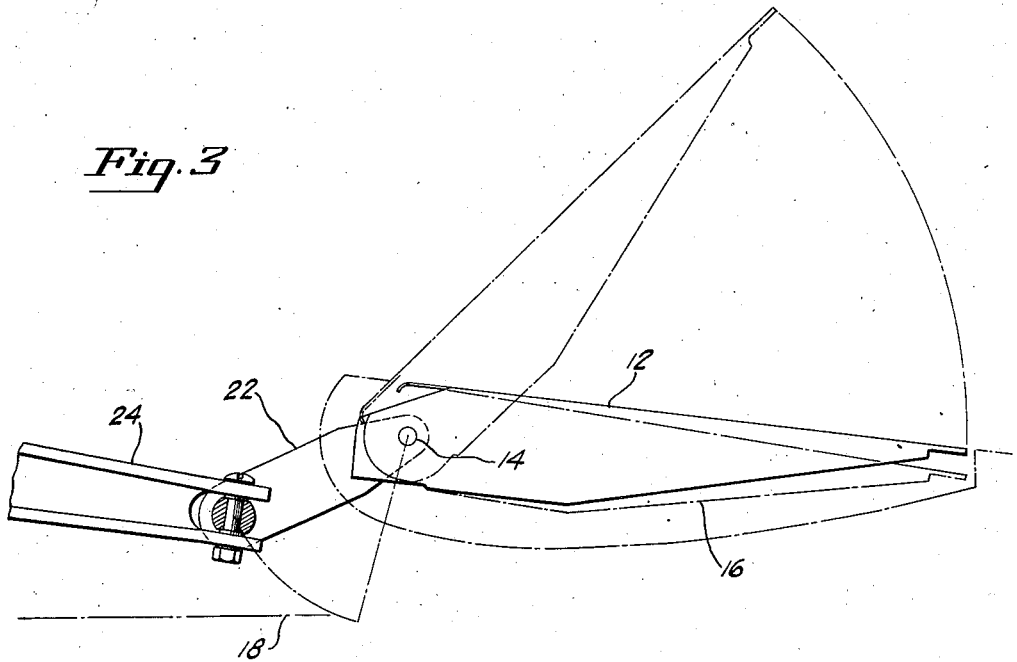
Fig. 3 is a partly diagrammatic sectional view through an airplane control element operated by the improved linkage showing the movement of the control element in response to movement of the operating linkage in different directions.

Fig. 3 particularly illustrates the sectional outline of a suitable form of lateral control flap 12. This flap is carried by the pivotal mounting 14 and is received, when in its neutral or inoperative position, in a depression or pocket 16 in the upper surface of the wing 18. In Fig. 3 the neutral position is indicated by the full line position of the flap, the lowermost position is indicated by the broken line position of the flap within the wing pocket and the uppermost position is indicated by the broken line position in which the flap projects above the upper surface of the wing. In the construction illustrated the flap may be inclined upwardly from its neutral position through an angle of approximately 50 degrees and may be inclined downwardly from its neutral position through an angle of approximately 3 degrees. These angles, however, may be varied within fairly wide limits depending upon the exigencies of the particular installation. The flap 12 is in the nature of a lift spoiler located in the upper surface of the wing somewhat ahead of the aileron 20 and may, if desired, be associated with a suitable wing slot to increase its lift spoiling effectiveness.

An arm or horn 22 extends from the forward portion of the flap adjacent the pivot 14 to a position downward and forward of the location of the pivot at which position the free end of the arm is pivotally connected to the adjacent end of a link 24 in such a manner that longitudinal movement of the link will rotate the flap about its pivotal mounting 14.

Figure 2:
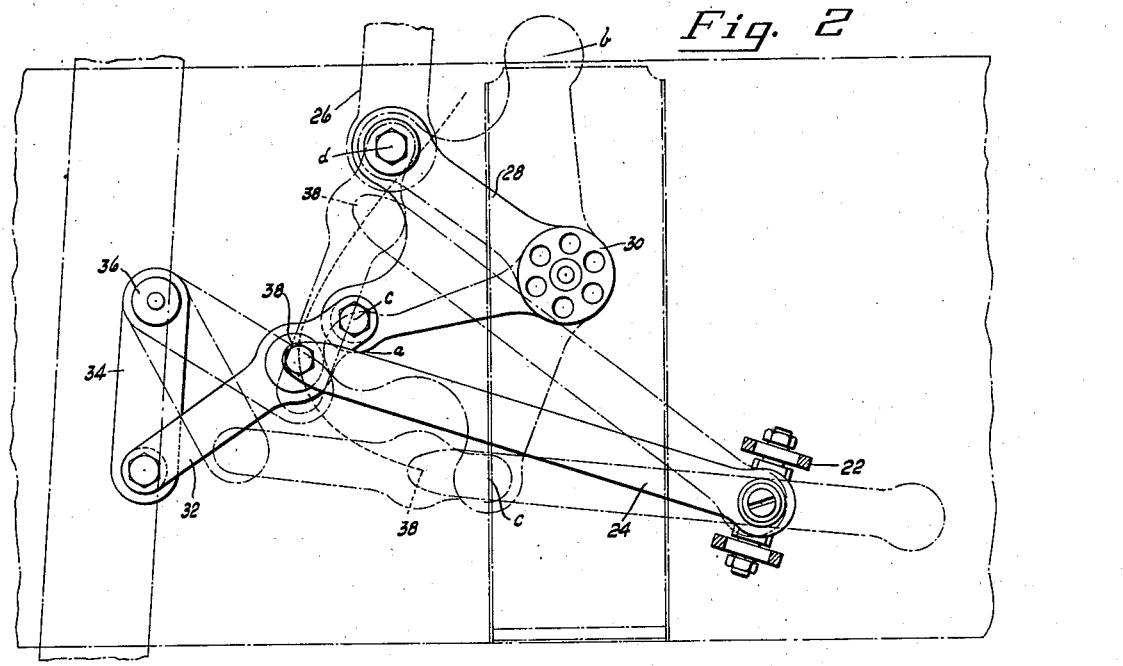
Fig. 2 is a top plan view on an enlarged scale of a linkage device constructed according to the invention.

Referring now to Figs. 1 and 2, the flap rotating movements are imparted to the link 24 by a shaft 26 acting through a toggle mechanism generally indicated at 28, and connected either directly or indirectly to the hand wheel or control column not illustrated, in such a manner that movement of the wheel or control column intended for lateral control of the airplane imparts longitudinal movement to the shaft 26.

Figure 4:
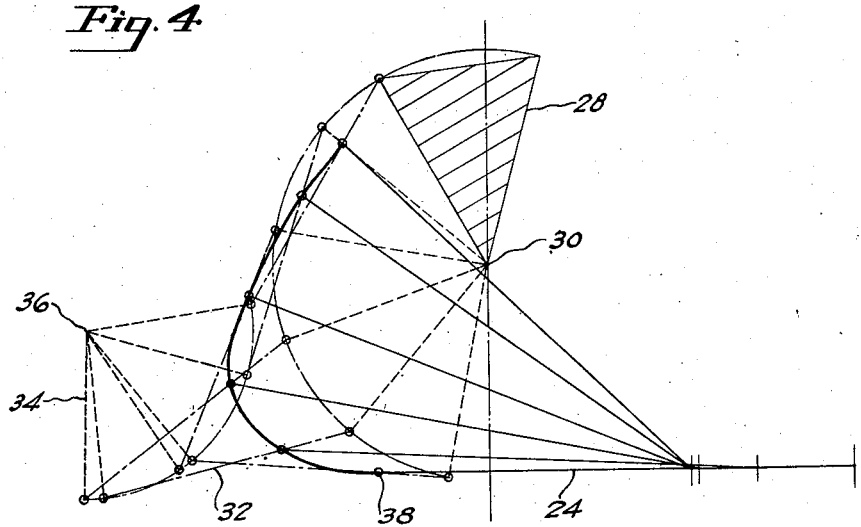
Fig. 4 is a centerline diagram of the linkage system in a number of operative positions.

The construction and operation of the toggle mechanism 28 is particularly illustrated in Figs. 2 and 4. The shaft 26 is pivotally connected at its outer end to one arm of a bell crank lever 28 which is pivotally secured at its center to a fixed portion of the wing by means of the bearing 30. The arm of the triangular bell crank lever 28 opposite that to which the shaft 26 is secured is pivotally connected to one end of a link 32, the opposite end of which is pivotally connected to the free end of a lever 34 which has its opposite end mounted on the fixed pivot 36, rigidly secured to a constructional member of the wing. The end of the link 24 opposite the arm 22 is pivotally connected to the link 32 at a point intermediate its length by means of the pin 38, this pin being located somewhat nearer to the associated arm of the bell crank lever 28 than to the corresponding end of the lever 34. Longitudinal movement of the shaft 26 swings the triangular bell crank lever 28 about the pivot 30 through the angle between the position a and the position b. This movement swings the bell crank lever connected end of the link 32 through the angle cd, the position of the above mentioned end of this lever corresponding to the neutral position of the flap being at e approximately half-way between c and d. From an inspection of Figs. 2 and 4 it will be observed that when the bell crank lever 28 is moved through the angle from c to e a relatively large longitudinal movement is imparted to the link 24, while a movement of the lever 28 from e to d imparts only a slight longitudinal movement to the link 24. It is thus apparent that, because of the angular relation between the lever 28 and the link 24, the link 24 is given a relatively large longitudinal movement when the lever 28 is moved in one direction from the neutral position and only a slight longitudinal movement when the link 28 is moved in the opposite direction from the neutral position. The link 24 is connected to the flap 12 in such a manner that the relatively large movement of the link controls the movement of the flap from its neutral position to its operative position above the surface of the wing while the relatively slight movement of the link 24 controls the movement of the flap from its neutral position to positions below the upper surface of the wing.

The relatively large range of movement of the link 24 is increased, and the relatively slight range of movement thereof are decreased by the arrangement of the link 32 and lever 34. When the angle between the link 32 and lever 34, when in their neutral position as illustrated in full lines in Fig. 2, is increased by a movement of the bell crank lever 28 from the position e to the position c, the pivot point 38 is moved out of an arc centered on the center of the pivot 30 in a direction to increase the longitudinal movement of the link 24. When the triangular lever 28 is moved through the angle from the position e to the position d the pivot point 38 is swung out of the same arc in a direction to counteract the movement imparted to the link 24 by the movement of the lever 28 about its pivot 30 so that during movement of the lever 28 from the position e to the position d the flap 12 is moved down into the wing a slight amount and is returned to its neutral position substantially flush with the upper surface of the wing at both ends of this range of movement. The curved path of the pin 38 and the corresponding movements of the link 24 is particularly shown in Fig. 4.

Only the left hand lateral control flap and its operating linkage has been illustrated but there is, as a matter of course, a right hand lateral control flap operated by a similar mechanism. Since the construction and operation of the right unit is exactly the same as that of the left hand unit described above it has not been thought necessary to illustrate the right hand unit for the purposes of this disclosure.

The result of the operation of the two similar control systems is that when the control column is moved to depress the left hand portion of the wing the left hand flap is raised to an operative position above the wing and the right hand flap is not moved to any material extent and, when the control column is moved to depress the right hand portion of the wing the right hand flap is raised to a position above the wing while the left hand flap is left substantially in its neutral position. At the same time the two flaps are always rigidly connected together in such a manner that neither flap is released at any time from the control mechanism and there is no transition point in the operation of the control mechanism between the operation of one flap and the operation of the other, the movement of the control column being perfectly smooth and uniform from one end of its range of lateral control movement to the other.

While a particular constructional embodiment has been illustrated and described for the purpose of disclosing the invention it is to be understood that the invention is not limited to the particular construction so illustrated and described but that such changes in the size, shape and arrangement of parts may be resorted to as come within the scope of the sub-joined claims.

Having now described the invention so that others skilled in the art may clearly understand the same what it is desired to secure by Letters Patent is as follows:

What is claimed is:

1. Means for operating an airplane control surface comprising, an axially movable shaft, a link operatively connected at one end to the control surface and having its opposite end disposed adjacent to one end of said shaft, and mechanism between the adjacent ends of said link and said shaft effective to vary the ratio of link movement to shaft movement at different predetermined positions of said shaft, said mechanism comprising a pair of levers rotatable about respective fixed centers, and an intermediate link member connecting said levers and connected intermediate its length to said opposite end of said first mentioned link.

2. Means for operating an airplane control surface comprising, an axially movable shaft, a link operatively connected at one end to the control surface and having its opposite end disposed adjacent to one end of said shaft, and mechanism between the adjacent ends of said link and said shaft effective to vary the ratio of link movement to shaft movement at different predetermined positions of said shaft, said mechanism comprising a lever rotatable about a fixed pivot and pivotally connected to the outer end of said shaft, a second lever rotatable about a fixed pivot spaced from the pivot of said first mentioned lever, a link connecting the free ends of said levers, and a pivotal connection between said opposite end of said first mentioned link and said lever-connecting link located at a position intermediate the length of said lever-connecting link.

3. Means for operating an airplane control surface comprising, an axially movable shaft, a link operatively connected at one end to said control surface and having its opposite end disposed adjacent to one end of said shaft, and mechanism between the adjacent ends of said link and said shaft effective to vary the ratio of link movement to shaft movement at different predetermined positions of said shaft, said mechanism comprising, a bell-crank lever rotatable about a fixed pivot and having one arm pivotally connected to the outer end of said shaft, a second lever rotatable about a fixed pivot spaced from the pivot of said bell-crank lever, a link connecting the other arm of said bell-crank lever to the free end of said second lever, and a pivotal connection between said opposite end of said first mentioned link and said lever-connecting link located at a position intermediate the length of said lever-connecting link.

4. Means for operating an airplane control surface comprising, an axially movable shaft, a link disposed at an angle to said shaft adjacent to the outer end thereof and operatively connected at one end to said control surface, and mechanism between the outer end of said shaft and the end of said link comprising, a bell-crank lever rotatable about a fixed pivot and having one arm pivotally connected to the outer end of said shaft, a second lever rotatable about a fixed pivot spaced from the pivot of said first mentioned lever, a link connecting the other arm of said bell-crank lever to the free end of said second lever, and a pivotal connection between the other end of said first mentioned link and said lever-connecting link located at a position intermediate the length of said lever-connecting link, said levers and said links being so located and dimensioned as to provide a path of travel for said link-carried pivotal connection such that movement of said connection through one-half of said path of travel will rotate said control surface through a relatively large angle to or from its neutral position and movements of said connection through the other half of said path will rotate the control surface through a relatively minute angle.

5. Means for operating an airplane control surface comprising, a shaft axially movable substantially equal amounts in both directions from a predetermined intermediate position, a link operatively connected at one end to said control surface and having its opposite end disposed adjacent to one end of said shaft, and mechanism between the adjacent end of said link and said shaft comprising, a bell-crank lever rotatable about a fixed pivot and having one arm pivotally connected to the outer end of said shaft, a second lever rotatable about a fixed pivot spaced from the pivot of said first mentioned lever, a link connecting the other arm of said bell-crank lever to the free end of said second lever, and a pivotal connection between said opposite end of said first mentioned link and said lever-connecting link located at a position intermediate the length of said connecting link, said lever and said links being so located and dimensioned as to provide a path of travel for said link carried connection such that movement of said connection through one-half of said path of travel will rotate said control surface through a relatively large angle to or from its neutral position and movements of said connections through the other half of said path will rotate the control surface through a relatively minute angle to its neutral position at each end of said other half of said path of travel.

6. Means for operating an airplane control surface comprising, a shaft axially movable substantially equal amounts in both directions from a predetermined intermediate position, a link operatively connected at one end to said control surface and having its opposite end disposed adjacent to one end of said shaft, and mechanism between the adjacent ends of said link and said shaft comprising, a bell-crank lever rotatable about a fixed pivot having one arm pivotally connected to the outer end of said shaft, a second lever rotatable about a fixed pivot spaced from the pivot of said bell-crank lever, a link connecting the other arm of said bell crank lever to the free end of said second lever, and a pivotal connection between said first mentioned link and said lever-connecting link located at a position intermediate the length of said lever-connecting link, said lever and said link being so located and dimensioned as to provide a path of travel for said link-carried pivotal connection such that movement of said connection through one-half of said path of travel will rotate said control surface through a relatively large angle to or from its neutral position and movements of said connection through the other half of said path will rotate the control surface through a relatively minute angle, said angles being at an approximate ratio to each other of fifty degrees to three degrees.

7. Operating means for an airplane wing flap comprising, an axially movable shaft, a bell crank lever mounted on a fixed pivot and having one arm pivotally connected to the end of said shaft, a second lever mounted on a fixed pivot spaced from the pivot of said bell crank lever, a link connecting the other arm of said bell crank lever with the free end of said second lever, and a second link pivotally connected at one end to an intermediate portion of said first mentioned link and connectible at its opposite end to said wing flap.

REX B. BEISEL.